United States Patent
Fujinami et al.

(10) Patent No.: US 6,828,066 B2
(45) Date of Patent: Dec. 7, 2004

(54) NONAQUEOUS ELECTROLYTE SECONDARY BATTERY

(75) Inventors: Tatsuo Fujinami, Hamamtsu (JP); Satoshi Suzuki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/246,685

(22) Filed: Sep. 19, 2002

(65) Prior Publication Data

US 2003/0073006 A1 Apr. 17, 2003

(30) Foreign Application Priority Data

Sep. 20, 2001 (JP) ........................................ 2001-286953
Sep. 17, 2002 (JP) ........................................ 2002-270002

(51) Int. Cl.$^7$ .............................................. H01M 6/16
(52) U.S. Cl. ...................... 429/329; 429/336; 429/331; 429/332; 429/231.1; 429/231.8
(58) Field of Search ................................. 429/336, 329, 429/331, 332, 231.1, 231.8

(56) References Cited

U.S. PATENT DOCUMENTS

| | | | |
|---|---|---|---|
| 5,891,592 A | * 4/1999 | Mao et al. | .................. 429/331 |
| 6,210,838 B1 | 4/2001 | Fujinami et al. | |
| 6,566,014 B1 | 5/2003 | Fujinami et al. | |

FOREIGN PATENT DOCUMENTS

| EP | 0 856 901 A1 | 8/1998 |
|---|---|---|
| FR | 2 794 750 A1 | 12/2000 |
| JP | 10-223258 A | 8/1998 |
| JP | 11-3728 A | 1/1999 |
| JP | 11-54151 A | 2/1999 |
| JP | 11-121033 A | 4/1999 |
| JP | 2001-55441 A | 2/2001 |

OTHER PUBLICATIONS

Mehta et al. "The use of boroxine rings for the development of high performance polyner electrolytes", Electrochimica Acta, 45 (8–9), pp. 1175–1180, 2000.*
Search Report issued on Apr. 14, 2004, in European Application No. 02021030.8.

* cited by examiner

*Primary Examiner*—Laura Weiner
(74) *Attorney, Agent, or Firm*—Burns, Doane, Swecker & Mathis, L.L.P.

(57) ABSTRACT

A nonaqueous electrolyte secondary battery includes positive and negative electrodes, a separator, a nonaqueous electrolyte provided by dissolving a lithium salt in a nonaqueous solvent. The nonaqueous electrolyte contains a compound as shown in the chemical formula below and has a boroxin ring and polyalkylene oxide chains:

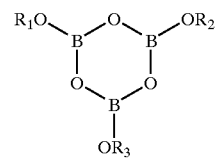

$R_1 = R_1' - (O-Alk_1)_{n1} -$
$R_2 = R_2' - (O-Alk_2)_{n2} -$
$R_3 = R_3' - (O-Alk_3)_{n3} -$ where $AlK_1$, $AlK_2$, $AlK_3$ are identical with or different from one another, each of $AlK_1$, $AlK_2$, $AlK_3$ representing one type of alkylene having a carbon number of 2 or 3, and $R'_1$, $R'_2$, $R'_3$ are identical with or different from one another, each of $R'_1$, $R'_2$, $R'_3$ representing one type of alkyl having a carbon number of 1 or 2.

10 Claims, 1 Drawing Sheet

NONAQUEOUS ELECTROLYTE SECONDARY BATTERY

INCORPORATION BY REFERENCE

This disclosure of Japanese Patent Application No. 2001-286953 filed on Sep. 20, 2001 including the specification, drawing and abstract is incorporated herein by reference in its entirety.

BACKGROUND OF THE INVENTION

1. Field of Invention

The invention relates to a nonaqueous electrolyte secondary battery with increased power, and more particularly to a nonaqueous electrolyte lithium secondary battery with increased power.

2. Description of Related Art

In a rechargeable nonaqueous electrolyte lithium secondary battery, generally, positive and negative active materials are used as host solids capable of reversibly receiving and releasing lithium atoms as guest atoms. In lithium ion batteries available in the market, for example, a lithium-transition metal oxide compound such as $LiMn_2O_4$, $LiNiO_2$ or $LiCoO_2$ is used as a positive active material and carbonaceous coke or graphite is used as a negative active material. The electrolyte is prepared by dissolving lithium salt $LiPF_6$ in a mixture of nonaqueous organic carbonate compounds such as ethylene carbonate, propylene carbonate, ethyl methyl carbonate, diethyl carbonate, and dimethyl carbonate. The electrolyte is impregnated in a separator.

A lithium ion battery in which lithium ions can move reversibly between electrodes with ease is possible to be charged and discharged for hundreds of cycles. The lithium ion battery, however, is likely to suffer from a capacity loss as it is repeatedly charged and discharged for a long period of time. Japanese Laid-Open Patent Publication No. 10-223258 discloses a technique for suppressing the capacity loss of the battery during charging and discharging cycles by adding a trialkoxy boroxin compound including boroxin rings to an electrolytic solution so as to prevent the capacity loss of the battery.

Besides, Japanese Laid-Open Patent Publications No. 11-3728 and 11-121033 disclose a technique for suppressing a capacity loss of the battery during charging and discharging cycles by adding a triphenyl boroxin compound including boroxin rings and its derivative compound to electrodes and an electrolytic solution. The quantity of the added triphenyl boroxin compound is 0.01 to 0.1 wt. % with respect to the weight of the electrode when it is added into the electrodes. The quantity of the added triphenyl boroxin compound is 0.01 to 0.1 mol/L with respect to the quantity of the electrolytic solution when it is added in the electrolytic solution.

When the boroxin ring compound is added to the electrolyte, the capacity loss of the battery may be suppressed during charging and discharging cycles as described above. However, power of the battery is not increased. Accordingly, the power of the battery is still not sufficient especially at a low temperature.

Also, Japanese Laid-Open Patent Publication No. 11-54151 discloses that a polymer including a boroxin ring and polyethylene oxides in its system can be used as an ion conductor. Nevertheless no description is made regarding a technique for increasing power of the battery by using an additive.

SUMMARY OF THE INVENTION

It is an object of the invention to provide a nonaqueous secondary battery, in particular a nonaqueous lithium secondary battery capable of generating increased power especially at low temperature by adding a small quantity of an additive to an electrolyte.

A nonaqueous electrolyte secondary battery includes a positive electrode, a negative electrode, a separator disposed between the positive electrode and the negative electrode, a nonaqueous electrolyte provided by dissolving a lithium salt in a nonaqueous solvent, with which the separator is impregnated. The nonaqueous electrolyte contains a compound having a boroxin ring and (poly)alkylene oxide chains, the compound being represented by a chemical formula.

Formula 1

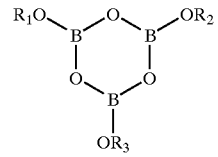

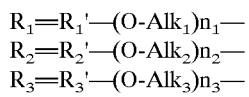

In the above formula, $AlK_1$, $AlK_2$, $AlK_3$ are identical with or different from one another, each of $AlK_1$, $AlK_2$, $AlK_3$ representing one type of alkylene having a carbon number of 2 or 3, and $R'_1$, $R'_2$, $R'_3$ are identical with or different from one another, each of $R'_1$, $R'_2$, $R'_3$ representing one type of alkyl having a carbon number of 1 or 2.

A nonaqueous electrolyte secondary battery includes a positive electrode, a negative electrode, a separator disposed between the positive electrode and the negative electrode, a nonaqueous electrolyte provided by dissolving a lithium salt in a nonaqueous solvent, with which the separator is impregnated. The nonaqueous electrolyte contains a compound having a boroxin ring and polyalkylene oxide chains, the compound being represented by a chemical formula.

Formula 2

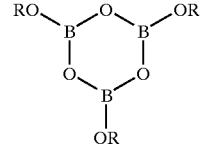

OR
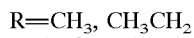

In the formula, n represents an integer equal to or greater than 1, and R' represents an alkyl with n equal to 1 or 2.

The polymerization degree of the alkylene oxide chain in the formula is 1 to 10.

The quantity of the compound represented by a chemical formula and contained in the nonaqueous electrolyte ranges from about 0.005 to 0.3 mol with respect to 1 mol of the lithium salt contained in a nonaqueous electrolytic solution of the nonaqueous electrolyte.

The nonaqueous solvent is a mixture of at least two different nonaqueous organic carbonate solvents selected from the group consisting of ethylene carbonate, propylene carbonate, diethyl carbonate, dimethyl carbonate, and ethylmethyl carbonate.

DETAILED DESCRIPTION OF PREFERRED EMBODIMENTS

Figure 1:
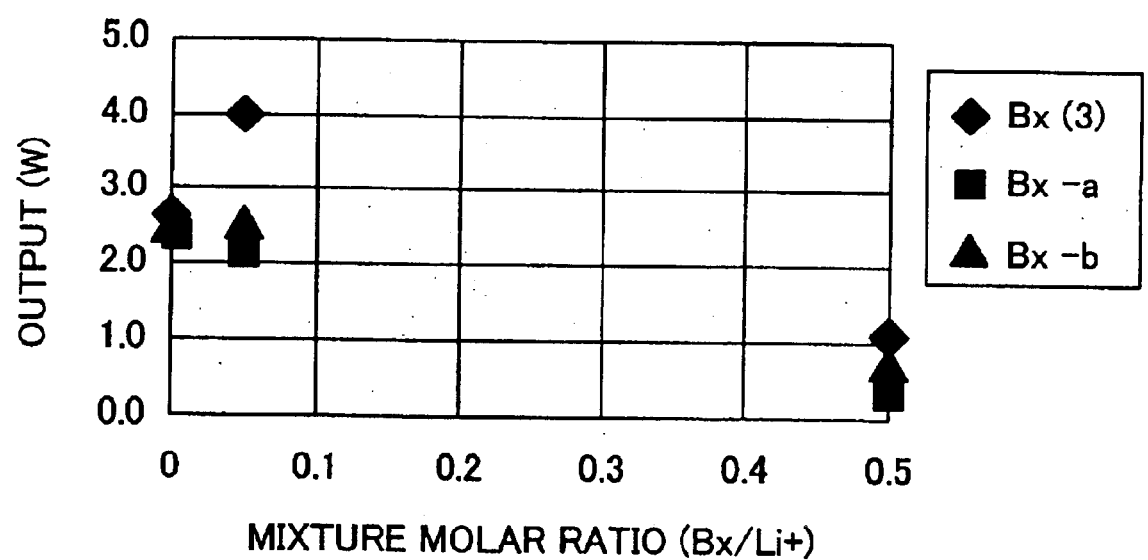
FIG. 1 is a graph for comparing the power of a battery according to the invention and that including a conventional boroxin compound as measured at −30° C.

In a nonaqueous electrolyte secondary battery according to the invention, a specific type of boroxin ring compound represented by chemical formula 2 is added, as additive, to a positive electrode, a negative electrode, a separator, and a nonaqueous electrolyte prepared by dissolving lithium salt in a nonaqueous solvent.

The boroxin ring compound is a boroxin compound including three chains (polyalkylene oxide chains) represented by the chemical formula 1. The boroxin compound is formed by bonding chains of alkylene oxide polymer to a boroxin ring. At least one of ethylene oxide and propylene oxide having polymerization degree n from 1 to 10 can be used as the alkylene oxide. Especially, in terms of the solubility to the nonaqueous electrolytic solution and the behavior in the solution, a significant effect can be obtained when the polymerization degree of the added ethylene oxide or/and propylene oxide is 3.

The above-described compound including the boroxin ring is obtained by heating a boron oxide (boron) with excess polyethylene oxide, excess polypropylene oxide, or alkoxy obtained by replacing a hydrogen of polyalkylene oxide at one end of its system with an alkyl group. The length of each alkylene oxide chain of the compound can be determined by selecting the polymerization degree n of the polyalkylene oxide used for the reaction. Thus, it is possible to produce the boroxin ring compound having alkylene oxide chains of different lengths by the reaction using alkylene oxides chains of different lengths.

It is assumed that lithium ions in the electrolytic solution can actively move due to ether linkages in polyalkylene oxide chains in the compound represented by the chemical formula 1 in which polyalkylene oxides are bonded to a boroxin ring. As a result, characteristics of the electrolyte added with the compound are improved, increasing power of the battery.

The boroxin ring compound serving as additive is added to a nonaqueous electrolytic solution. The quantity of the additive is preferably between 0.005 and 0.3 mol with respect to 1 mol of lithium salt $LiPF_6$ contained in the electrolytic solution. It is not preferable to add the additive with the quantity less than 0.005 mol because no effect is obtained. Also it is not preferable to add the additive with the quantity exceeding 0.3 mol because the power of the battery is decreased.

As represented in the molar ratio with respect to the lithium salt $LiPF_6$ as above, even a small quantity of the boroxin ring compound is effective for increasing the power of the battery, especially in a low temperature range.

In the meantime, a positive electrode of the nonaqueous secondary battery is formed, for example, by applying one kind of transition metal oxide, as an active material, selected from $LiMn_2O_4$, $LiNiO_2$, $LiCoO_2$ or the like to an aluminum foil as a current collecting material together with PVDF as a bonding agent.

On the other hand, a negative electrode is formed by applying graphite as an active material, which is a carbonaceous material, to a copper foil as a current collecting material together with the PVDF as a bonding agent.

A mixture of nonaqueous carbonate solutions such as ethylene carbonate (EC), propylene carbonate (PC), ethyl methyl carbonate (DEC), diethyl carbonate (DMC), dimethyl carbonate (EMC) or the like is used as the nonaqueous electrolytic solution. Lithium salt such as $LiPF_6$ is dissolved in the nonaqueous electrolytic solution as electrolyte to produce a nonaqueous electrolyte. Then, a predetermined quantity of the boroxin ring compound is added to the produced nonaqueous electrolyte. Then, a separator impregnated with the nonaqueous electrolyte is arranged between the positive and negative electrodes to be rolled in the form of a cylinder and is stored in a battery case, thus producing a cylinder-shaped battery.

According to the invention, as a result of adding the boroxin ring compound to the electrolytic solution, the conductivity of the battery is reduced to a certain extent. The power of the battery, however, is increased compared with the power obtained when the boroxin ring compound is not added to the electrolytic solution. The increase in the power of the battery becomes significant especially at the temperature (−30° C.) in the low range.

In the invention, the power of the secondary battery represents its discharge capacity achieved when the battery has been charged from 3.0 V to 3.75V which is 60% of the full charge capacity of the battery and is represented in watts(W). Here, the battery is charged at 25° C.

Hereinafter, the invention will be more specifically described with reference to examples.

In the examples of the invention, a cylinder-shaped battery measuring 18 mm in diameter and 65 mm in height is produced as a secondary battery for evaluation.

FIRST EXAMPLE

In a first embodiment, about 5 g of powder of transition metal oxide $LiNiO_2$ (approximately 5 g), carbon as a conductive carbonaceous diluent, and polyvinylidene fluoride (PVDF) as a bonding agent were mixed at the mixture ratio of 85:10:5. Subsequently, a positive electrode was formed by evenly applying the resultant mixture to a thin aluminum foil as a current collecting material.

A negative electrode was formed by applying a mixture of graphite and polyvinylidene fluoride (PVDF) as the bonding agent to a thin copper foil as a current collecting material.

A micro-porous polyethylene film was used as a separator.

A mixed solution was prepared by mixing EC (ethylene carbonate) and DEC (diethylene carbonate) at the volumetric mixture ratio of 50:50. Then the electrolyte was obtained by dissolving a lithium salt $LiPF_6$ in the resultant mixture such that the concentration became 1 mol. Various types of the cylinder-shaped batteries were prepared by using two types of boroxin compound (n of the chemical formula 1:3 (Bx3) and 7.2 (Bx7.2), that is, 0.005, 0.05, and 0.5, respectively. As shown in Table 1, a boroxin compound, with which n of the chemical formula 2 is 3 (Bx 3), and that with which n of the chemical formula 2 is 7.2 (Bx 7.2) (R'=$CH_3$) are prepared. Then, 005, 0.05, and 0.5 mol (molar quantity with respect 1 mol of lithium salt $LiPF_61$) of each boroxin compound is added to the electrolyte to produce a cylinder-shaped battery. In the above case, Bx(n) represetns the boroxin ring compound (n=(n1+n2+n3)/3).

The charged capacity of the battery will be referred to as SOC (state of charge) and will be represented in percentage (0 to 100%). In the evaluation, the power of the battery represented in watts was measured when the battery became charged by 60% (SOC was 60%).

The power (watts) of the battery was calculated in the following manner;

1. Each battery was charged until SOC became 60%.
2. When SOC became 60%, the battery was discharged at constant current, and the voltage was measured 10 seconds after the start of the discharge.
3. The voltage was measured several times at different currents in the same manner as the step 2 described above.
4. The currents and the voltage measured 10 seconds after the start of the battery discharge are plotted with respect to the horizontal axis and the vertical axis, respectively.
5. The plotted values were linearly approximated and current corresponding to 3V was calculated (represented as $I_{3.0V}$).
6. The power was calculated using an expression; $I_{3.0V} \times 3.0$ V (W=1V).

The inclination of the line plotted in the steps 4 and 5 described above represents a battery internal resistance r (V=RI). As the value of R decreased, the inclination of the line decreased and the value of $I_{3.0V}$ increased, namely the power increased (increase in power ≈ decrease in internal resistance).

The battery generated 4.1V when SOC was 100%, 3.75V when SOC was 60%, and 3.0V when SOC was 0%. The battery was charged from 3.0V (SOC=0%) to 3.75V (SOC=60%), and the power of the battery represented in watts was measured. The result of the measurement is shown in Table 1.

TABLE 1

| Additive | Qty of additive (mol/LiPF$_6$ 1 mol) | Power at 25° C. (W) | Power at −30° C. (W) | Conductivity (mS/cm) |
| --- | --- | --- | --- | --- |
| None | 0 | 40.5 | 2.58 | 7.80 |
| Bx 3 | 0.005 | 40.6 | 3.06 | 7.75 |
|  | 0.05 | 41.4 | 3.97 | 7.50 |
|  | 0.5 | 22.0 | 1.02 | 4.25 |
| Bx 7.2 | 0.005 | 40.4 | 2.43 | 7.65 |
|  | 0.05 | 41.0 | 3.23 | 7.20 |
|  | 0.5 | 15.0 | 0.56 | 2.90 |

As shown in Table 1, the power of the battery increased when 0.05 mol of the boroxin compound (Bx) was added with respect to 1 mol of lithium salt LiPF$_6$. The increase in the power was in particular significant at −30° C., thus exhibiting a remarkable effect. In contrast, when 0.5 mol of the boroxin compound was added, the power of the battery becomes lower than that generated when no boroxin compound was added. Accordingly, an optimum range of the quantity of the additive is considered to lie in the side of small quantities.

SECOND EXAMPLE

A battery used in the second embodiment has the same construction as that used in the first embodiment. However, transition metal oxide LiMn$_2$O$_4$ was alternatively used to form the positive electrode and an electrolyte having different composition of the mixture is used.

To form the positive electrode, LiMn$_2$O$_4$, conductive material (carbon), and PVDF were applied to an aluminum foil as the current collecting material of the positive electrode at the ratio of 85:10:5.

To form the negative electrode, carbon (graphite) added with the PVDF as a bonding agent was applied to a copper foil which was the current collecting material of the negative electrode.

EC, PC, and DMC were mixed at the ratio of 30:20:50, and LiPF$_6$ was dissolved in the resulting solution at a concentration of 1 mol/L, to use it as the electrolytic solution. Like Example 1, the cylinder-shaped batteries were prepared by using boroxin compounds (Bx3: n=3, R'=CH3 in the chemical forumula) and changing the molar ratio of the boroxin compared to the electrolytic solution into 0.02, 0.05, 0.1, 0.2 to 1 mol of the LiPF6 at different temperatures (25° C., −10° C., −30° C.). The resultant outputs of the respective batteries were measured. Meanwhile, the battery in Example 2 generated approximately 3.64 V when it is charged by 40%, that is, (SOC 40%=approximately 3.64 V)

The measurement results are shown in Table 2.

TABLE 2

| Additive | Qty of additive (mol/LiPF$_6$ 1 mol) | Output at 25° C. (W) | Output at −10° C. (W) | Output at −30° C. (W) |
| --- | --- | --- | --- | --- |
| None | 0 | 38.4 | 10.6 | 1.38 |
| Bx 3 | 0.02 | 38.2 | 12.0 | 1.89 |
|  | 0.05 | 40.4 | 14.8 | 2.21 |
|  | 0.1 | 38.1 | 12.1 | 1.75 |
|  | 0.2 | 33.0 | 10.2 | 1.17 |

As shown in Table 2, when the quantity of the added boroxin compound was between 0.02 mol/LiPF$_6$ 1 mol and 0.1 mol/LiPF$_6$ 1 mol, the power of the battery became higher than the power generated when no boroxin compound is added at 25° C., −10° C., and −30° C. Particularly when 0.05 mol of the boroxin compound was added with respect to 1 mol of lithium salt LiPF$_6$, the generated power was significantly increased. This indicates that adding the boroxin compound is effective. It also indicates from the results shown in Table 2 that addition of the boroxin compound by the quantity ranging 0.005 mol/LiPF$_6$ 1 mol and 0.5 mol/LiPF$_6$ 1 mol is particularly effective.

Comparative Example

The battery of the comparative example has the same construction as that of the first example. A positive electrode of the battery was formed by applying LiNiO$_2$, conductive material (carbon), and PVDF to an aluminum foil as the current collecting material of the positive electrode at the mixture ratio of 85:10:5.

A negative electrode of the battery was formed by applying carbon (graphite) added with the PVDF as the bonding agent to a copper foil as the current collecting material of the negative electrode.

The electrolytic solution was prepared by dissolving LiPF$_6$ into the solution at a concentration of 1 mol/L. The composition of the solvent is 1M LiPF$_6$ EC/DEC=50/50+ α=Bx.

In this example, Bx3 (the boroxin compound in the second example), Bxa (a compound represented in the chemical formula 3), Bxb (a compound represented in the chemical formula 4) are respectively added to electrolytic solutions each containing the same concentration of lithium as that in the second embodiment. The power of the barratry is then compared by using respective electrolytes thus obtained and an electrolyte including no compound at −30° C. as shown in FIG. 1.

Formula 3

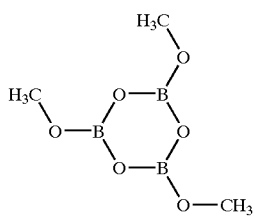

Formula 4

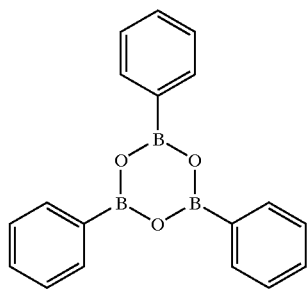

According to the result, when 0.05 mol of the boroxin compound was added with respect to 1 mol of LiPF$_6$, the power of battery became higher than that generated when a conventional additive for preventing capacity loss was added. Here, the result shows that adding even a small quantity of the boroxin compound is effective.

As described above, the lithium secondary battery of the invention in which a predetermined quantity of the boroxin compound including alkylene oxide chains is added to the electrolytic solution is capable of generating increased power, especially at low temperature of −30° C., and therefore may be effectively used in place of a conventional battery, the power of which decreases at low temperature.

What is claimed is:

1. A nonaqueous electrolyte secondary battery comprising:

a positive electrode;

a negative electrode, a separator disposed between the positive electrode and the negative electrode;

a nonaqueous electrolyte provided by dissolving a lithium salt in a nonaqueous solvent, with which the separator is impregnated, wherein:

the nonaqueous electrolyte contains a compound having a boroxin ring and polyalkylene oxide chains, the compound being represented by a chemical formula:

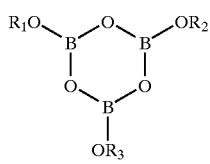

wherein $R_1 = R_1' - (O\text{-}Alk_1)_{n1} - $, $R_2 = R_2' - (O\text{-}Alk_2)_{n2} - $, $R_3 = R_3' - (O\text{-}Alk_3)_{n3} - $, where $AlK_1$, $AlK_2$, $AlK_3$ are identical with or different from one another, each of $AlK_1$, $AlK_2$, $AlK_3$ representing an alkylene having a carbon number of 2 or 3, and $R_1'$, $R_2'$, $R_3'$ are identical with or different from one another, each of $R_1'$, $R_2'$, $R_3'$ representing an alkyl having a carbon number of 1 or 2, wherein $n_1$, $n_2$ and $n_3$ each independently represent 1 to 10, and wherein a quantity of the compound represented by the chemical formula and contained in the nonaqueous electrolyte ranges from about 0.005 to 0.3 mol with respect to 1 mol of the lithium salt contained in a nonaqueous electrolytic solution of the nonaqueous electrolyte.

2. A nonaqueous electrolyte secondary battery according to claim 1, wherein:

the alkylene is selected from the group consisting of —CH$_2$CH$_2$—, —CH$_2$CH(CH$_3$)— and —CH(CH$_3$)CH$_2$—; and the alkyl is selected from the group consisting of —CH$_3$ and —CH$_2$CH$_3$.

3. A nonaqueous electrolyte secondary battery according to claim 1, wherein the nonaqueous solvent is a mixture of at least two different nonaqueous organic carbonate solvents selected from the group consisting of ethylene carbonate, propylene carbonate, diethyl carbonate, dimethyl carbonate, and ethylmethyl carbonate.

4. A nonaqueous electrolyte secondary battery comprising:

a positive electrode;

a negative electrode;

a separator disposed between the positive electrode and the negative electrode;

a nonaqueous electrolyte provided by dissolving a lithium salt in a nonaqueous solvent, with which the separator is impregnated, wherein:

the nonaqueous electrolyte contains a compound having a boroxine ring and polyalkylene oxide chains, the compound being represented by a chemical formula:

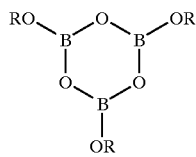

wherein $R = R'(OCH_2CH_2)_n - $, $R' = CH_3$ or $CH_3CH_2$, where n represents an integer equal to or greater than 1, and wherein a quantity of the compound represented by the chemical formula and contained in the nonaqueous electrolyte ranges from about 0.005 to 0.3 mol with respect to 1 mol of the lithium salt contained in a nonaqueous electrolytic solution of the nonaqueous electrolyte.

5. A nonaqueous electrolyte secondary battery according to claim 4, wherein n of the alkylene oxide chain shown in the chemical formula of claim 3 is in a range of 1 to 10.

6. A nonaqueous electrolyte secondary battery according to claim 4, wherein the alkylene oxide chain comprises at least one of ethylene oxide and propylene oxide.

7. A nonaqueous electrolyte secondary battery according to claim 4, wherein the positive electrode is prepared by applying a mixture of a transition metal oxide and a bonding agent to a current collecting material.

8. A nonaqueous electrolyte secondary battery according to claim 4, wherein the negative electrode is prepared by applying a mixture of a carbonaceous material and a bonding agent to a current collecting material.

9. A nonaqueous electrolyte secondary battery comprising:
- a positive electrode;
- a negative electrode;
- a separator disposed between the positive electrode and the negative electrode;
- a nonaqueous liquid electrolyte provided by dissolving a lithium salt in a nonaqueous solvent, with which the separator is impregnated, wherein:
- the nonaqueous liquid electrolyte comprise the dissolved lithium salt, the nonaqueous solvent, and a compound having a boroxine ring and polyalkylene oxide chains, the compound being represented by a chemical formula:

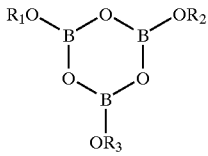

wherein
$R_1 = R_1' \text{—} (O\text{-}Alk_1)_{n1}\text{—}$,
$R_2 = R_2' \text{—} (O\text{-}Alk_2)_{n2}\text{—}$,
$R_3 = R_3' \text{—} (O\text{-}Alk_3)_{n3}\text{—}$,
where $AlK_1$, $AlK_2$, $AlK_3$ are identical with or different from one another, each of $AlK_1$, $AlK_2$, $AlK_3$ representing an alkylene having a carbon number of 2 or 3, and $R_1'$, $R_2'$, $R_3'$ are identical with or different from one another, each of $R_1'$, $R_2'$, $R_3'$ representing an alkyl having a carbon number of 1 or 2, wherein $n_1$, $n_2$ and $n_3$ each independently represent 1 to 10,
wherein a quantity of the compound represented by the chemical formula and contained in the nonaqueous electrolyte ranges from about 0.005 to 0.3 mol with respect to 1 mol of the lithium salt contained in a nonaqueous electrolytic solution of the nonaqueous electrolyte.

10. A nonaqueous electrolyte secondary battery comprising:
- a positive electrode;
- a negative electrode;
- a separator disposed between the positive electrode and the negative electrode;
- a nonaqueous liquid electrolyte provided by dissolving a lithium salt in a nonaqueous solvent, with which the separator is impregnated, wherein:
- the nonaqueous liquid electrolyte comprises the dissolved lithium salt, the nonaqueous solvent, and the compound having a boroxine ring and polyalkylene oxide chains, the compound being represented by a chemical formula:

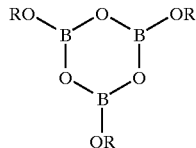

wherein
$R = R'(OCH_2CH_2)_n\text{—}$,
$R' = CH_3$ or $CH_3CH_2$, and
n represent an integer equal to or greater than 1,
wherein a quantity of the compound represented by the chemical formula and contained in the nonaqueous electrolytes ranges from about 0.005 to 0.3 mol with respect to 1 mol of the lithium salt contained in a nonaqueous electrolytic solution of the nonaqueous electrolyte.

* * * * *

UNITED STATES PATENT AND TRADEMARK OFFICE
CERTIFICATE OF CORRECTION

PATENT NO. : 6,828,066 B2  Page 1 of 1
DATED : December 7, 2004
INVENTOR(S) : Tatsuo Fujinami et al.

It is certified that error appears in the above-identified patent and that said Letters Patent is hereby corrected as shown below:

Title page,
Item [75], Inventors, change "Hamamtsu" to -- Hamamatsu --.

Signed and Sealed this

Thirtieth Day of August, 2005

JON W. DUDAS
*Director of the United States Patent and Trademark Office*